United States Patent [19]
Dieudonne et al.

[11] Patent Number: 5,703,707
[45] Date of Patent: Dec. 30, 1997

[54] HIGH CAPACITY SWITCHING MATRIX

[75] Inventors: Marc Dieudonne, Igny; Philippe Perrier, Velizy-Villacoublay, both of France

[73] Assignee: Alcatel Cit, Paris, France

[21] Appl. No.: 661,775

[22] Filed: Jun. 13, 1996

[30] Foreign Application Priority Data

Jun. 14, 1995 [FR] France .................. 95 07070

[51] Int. Cl.⁶ .................................. H04J 14/02
[52] U.S. Cl. .............. 359/128; 359/117; 385/17; 340/825.79
[58] Field of Search .................. 359/117, 128, 359/139, 154, 173; 385/17; 340/825.79; 370/357, 380

[56] References Cited

U.S. PATENT DOCUMENTS

| | | | |
|---|---|---|---|
| 4,894,818 | 1/1990 | Fujioka et al. | 359/117 |
| 5,371,621 | 12/1994 | Stevens | 359/117 |
| 5,537,239 | 7/1996 | Sotom et al. | 359/117 |

FOREIGN PATENT DOCUMENTS

0494831A2  7/1992  European Pat. Off. .

OTHER PUBLICATIONS

R. Gidron, "TeraNet: a multi-gigabits per second ATM network", *Computer Communications*, vol. 15, No. 3, Apr. 1992, Guildford, GB, pp. 143–152, XP 000249955.

*Primary Examiner*—Kinfe-Michael Negash
*Attorney, Agent, or Firm*—Sughrue, Mion, Zinn, Macpeak & Seas, PLLC

[57] ABSTRACT

A simple implementation of a high-capacity switching matrix includes four input functional modules each having one input and four outputs and four output functional modules each having four inputs and one output. A broadcast network has 16 inputs connected to the 16 outputs of the input functional modules and 16 outputs connected to the 16 inputs of the output functional modules to broadcast four signals from each input functional module simultaneously to each output functional module. The broadcast network includes four send subsystems each sending four optical carriers at four different wavelengths $\lambda_1, \ldots \lambda_4$ and four receive subsystems each receiving four optical carriers at these respective wavelengths. The broadcast network further includes four optical buses each connected to a respective input of a receive subsystem and to a respective send subsystem so that the jth bus for j=1 through 4 receives from the kth send subsystem the carriers at the wavelengths $\lambda_{1-k(modulo\ 4)}, \ldots \lambda_{4-k(modulo\ 4)}$. Applications include switching equipment.

2 Claims, 2 Drawing Sheets

HIGH CAPACITY SWITCHING MATRIX

BACKGROUND OF THE INVENTION

1. Field of the Invention

The invention concerns a switching matrix, in particular a switching matrix for asynchronous transfer mode cells, having a high capacity.

2. Description of the prior art

First generation asynchronous transfer mode switching matrices have a low capacity, typically between 128×128 and 512×512 ports with a bit rate of 155 Mbit/s. The next generation of matrices will have to have a higher capacity, for example 4 000×4 000 ports at 155 Mbit/s or even 512×512 ports at 2.5 Gbit/s. At present the number of ports of a matrix for a given bit rate is limited by technological problems. One solution is to use a network of several matrices, which is equivalent to a matrix of greater capacity at least in terms of the number of ports. A network of this kind usually has several stages, each stage including one or more matrices having a smaller number of ports than the network as a whole. This solution has the following drawbacks: an increase in the number of control means, since control means are required for each stage; an increase in the number of propagation time-delays, since each stage introduces an additional time-delay; and an increase in the dissipated power, since there are many matrices in a network of this kind.

A conventional asynchronous transfer mode matrix functional structure having N inputs and N outputs includes N input functional modules, a broadcast network and N output functional modules, each output functional module including a buffer memory for queuing cells addressed to the same output but that cannot be sent to that output at the same time. In one implementation the set of outputs is divided into several subsets and there is one buffer memory for each subset of outputs. In terms of the physical implementation, one card can carry several input functional modules and one card can carry several output functional modules.

By definition, a switching matrix must be able to route a cell from any matrix input to any matrix output. To this end, each of the N input functional modules has N outputs and each of these outputs is connected by the broadcast network to each of the N output functional modules. The broadcast network must therefore provide $N^2$ simultaneous connections between the input functional modules and the output functional modules. The input functional modules and the output functional modules are not usually on the same card, but on several cards. The $N^2$ connections are made via a backplane connecting the cards.

In the current state of the art, the input functional modules and the output functional modules are electronic and the bits constituting each cell are not transmitted in series but in parallel, typically in groups of 8 or 16, in order to divide the transmission bit rate by 8 or by 16, respectively. In the case of a matrix with 128×128 ports, the number of connections between the input functional modules and the output functional modules must therefore be $128^2=16\ 384$ if the bit rate is not modified or 8 or 16 times higher if the bit rate is modified. A backplane providing this very high number of connections would therefore be required. The technology of printed circuit backplanes cannot provide such a high number of connections.

A backplane providing connections at a much higher bit rate than conventional backplanes by using optical waveguides is known in itself. The article: A PHOTONIC BACKPLANE FOR A HIGH CAPACITY TIME SWITCH by D. A. Kahn et al, International Switching Symposium 1987 describes a backplane of this type. Each bus is in the form of an optical waveguide including couplers provided with optical connectors for the cards carrying the electronic circuits. Each bus can therefore transmit data at several Gbit/s. It is therefore not necessary to use 8 or 16 connections in parallel to obtain a high bit rate. The above article also describes an asynchronous transfer mode switching matrix structure having 16×16 ports. The matrix is divided into 16 subsets each corresponding to one column of the matrix, each subset being equivalent to 16 switches that would be located at the crosspoints constituting a column of the matrix. The matrix has 16 vertical buses and 16 horizontal buses. Each subset includes one vertical optical bus. The optical buses are each equivalent to a very high capacity local area network using a time division multiplex access protocol. This structure has the advantage of solving the problem of the number of connections and their capacity, and therefore enables the number of ports of a matrix to be increased. However, this type of bus is complex to implement because it is necessary to use a local area network type access protocol.

The article: AN OPTICAL BACKPLANE FOR HIGH PERFORMANCE SWITCHES by G. J. GRIMES et al, International Switching Symposium 1990 describes the use of an optical bus backplane for interconnecting electronic functional modules in switching equipment. The functional modules are simply connected in parallel to the buses, but they use a time-division multiple access protocol.

Simplifying the backplanes in switching equipment using high bit rate optical buses is thus known in itself. However, the proposed solutions use access protocols that greatly complicate the connections.

The aim of the invention is to propose a switching matrix structure, in particular for asynchronous transfer mode cells, the capacity of which is very greatly improved compared to what is possible with conventional electrical connections, without the connections being complex.

SUMMARY OF THE INVENTION

The invention consists in a switching matrix including:

N input functional modules each having one input and N outputs;

N output functional modules each having N inputs and one output;

a broadcast network having $N^2$ inputs connected to the $N^2$ outputs of the input functional modules and $N^2$ outputs connected to the $N^2$ inputs of the output functional modules to broadcast simultaneously N signals from each input functional module to each output functional module;

wherein said broadcast network includes:

N send subsystems each including means for sending N optical carriers at different wavelengths $\lambda_i$ where $i=1 \ldots N$, respectively modulated by N signals from an input functional module;

N receive subsystems each including means for receiving N optical carriers at said N wavelengths, extracting N signals modulating the respective carriers and forwarding them to an output functional module; and N optical buses each coupled to a respective input of a receive subsystem and each coupled to a respective send subsystem so that the jth bus, for $j=1$ through N, receives from the kth send subsystem the carriers at the wavelengths:

$\lambda_{1-k(modulo\ N)}, \ldots, \lambda_{N-k(modulo\ N)}$.

The above matrix simplifies the implementation because N spectrally multiplexed optical connections are sufficient, instead of $N^2$ electrical connections with no bit rate modification. Current technology can provide optical transmitters operating at 16 different fixed wavelengths and optical demultiplexers that can separate out the 16 fixed wavelengths. It is therefore possible to implement an optical matrix with 16×16 ports using this technology. In this case, the backplane comprises only 16 optical buses, instead of:

- $16^2$=256 electrical buses, assuming no bit rate change (155 Mbit/s);
- $16^2$×2 048 electrical buses assuming that the bit rate (1.24 Gbit/s) would be reduced by a factor of 8 for the electrical connections;
- $16^2$×16=4 096 electrical buses assuming that the bit rate (5 Gbit/s) would be reduced by a factor of 16 for the electrical connections.

The invention will be better understood and other features will emerge from the following description and the accompanying drawings.

DETAILED DESCRIPTION OF THE PREFERRED EMBODIMENT

Figure 1:
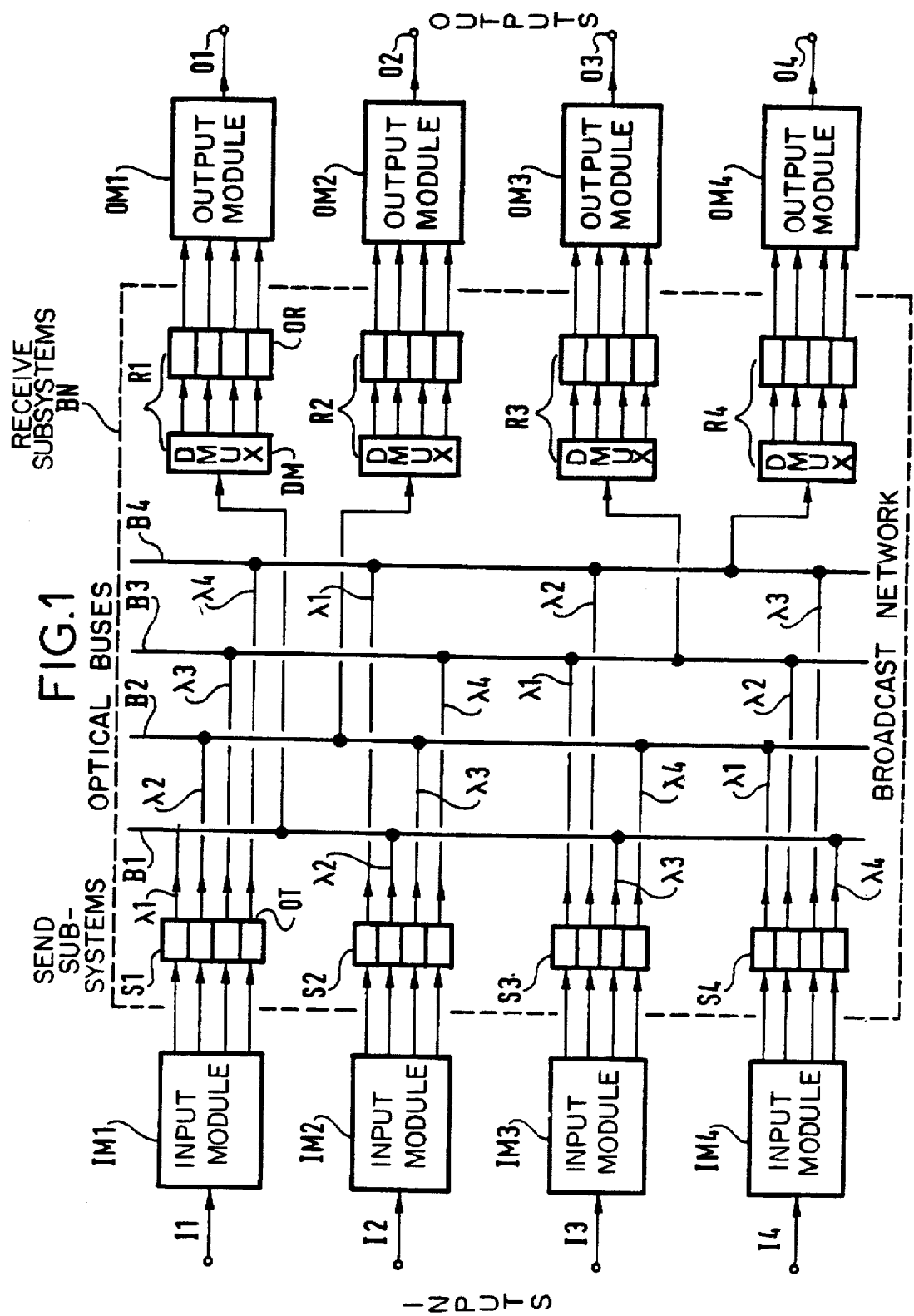
FIG. 1 is a block diagram of one embodiment of a matrix of the invention. To simplify the diagram this matrix has only 4×4 ports.

This embodiment includes:

four inputs I1, I2, I3, I4 receiving cells at 1 244 Mbit/s;

four input functional modules IM1, IM2, IM3, IM4 implementing the following functions: cell resynchronization, routing label assignment for each cell, cell switching and duplication for broadcasting, if necessary, each input functional module having four outputs and each cell being switchable either to one only of these outputs or to several of them in the case of a cell to be broadcast to more than one destination;

a broadcast network BN having 4×4 inputs and 4×4 outputs;

four output functional modules OM1, OM2, OM3, OM4 each having four inputs connected to respective outputs of the broadcast network BN and an output constituting a respective output 01, 02, 03, 04 of the matrix; the essential function of each of the output functional modules is to constitute a queue for the cells addressed to one output of the matrix.

In this embodiment the input functional modules and the output functional modules are electronic and the broadcast network includes electrical-optical converter means and optical-electrical converter means. To be more precise, the broadcast network BN includes:

four electrical-optical converter/send subsystems S1, S2, S3, S4 each including four optical transmitters OT, the optical transmitters of each subset transmitting respective optical carriers at different wavelengths $\lambda 1, \lambda 2, \lambda 3, \lambda 4$;

four optical receive subsystems R1, R2, R3, R4 each comprising a demultiplexer DM splitting the carriers at wavelength $\lambda 1, \lambda 2, \lambda 3, \lambda 4$ between respective outputs and four optical receivers OR connected to respective outputs of the demultiplexer DM; and four optical buses B1, B2, B3, B4 each including five optical couplers (no reference number) represented by black dots.

The four outputs of each send subsystem S1, S2, S3, S4 are connected to the respective optical buses B1, B2, B3, B4 by four couplers, but each optical subsystem supplies a different wavelength to a given coupler. The bus B1 receives: the carrier at wavelength $\lambda 1$ from the first output of the subsystem S1, the carrier at wavelength $\lambda_2$ from the second output of the subsystem S2, the carrier at wavelength $\lambda 3$ from the third output of the subsystem S3 and the carrier at wavelength $\lambda 4$ from the fourth output of the subsystem S4.

The bus B2 receives: the carrier at wavelength $\lambda 2$ from the second output of the subsystem S1, the carrier at wavelength $\lambda 3$ from the third output of the subsystem S2, the carrier at wavelength $\lambda 4$ from the fourth output of the subsystem S3 and the carrier at wavelength $\lambda 1$ from the first output of the subsystem S4.

The bus B3 receives the carrier at wavelength $\lambda 3$ from the third output of the subsystem S1, the carrier at wavelength $\lambda 4$ from the fourth output of the subsystem S2, the carrier at wavelength $\lambda 1$ from the first output of the subsystem S3 and the carrier at wavelength $\lambda 2$ from the second output of the subsystem S4.

The bus B4 receives the carrier at wavelength $\lambda 4$ from the fourth output of the subsystem S1, the carrier at wavelength $\lambda 1$ from the first output of the subsystem S2, the carrier at wavelength $\lambda 2$ from the second output of the subsystem S3 and the carrier at wavelength $\lambda 3$ from the third output of the subsystem S4.

One input of the demultiplexer DM of the subsystem R1 is connected to the bus B1 by a coupler. One input of the demultiplexer of the subsystem R2 is connected to the bus B2 by a coupler. One input of the demultiplexer of the subsystem R3 is connected to the bus B3 by a coupler. One input of the demultiplexer of the subsystem R4 is connected to the bus B4 by a coupler. In this way each of the receive subsystems R1, R2, R3, R4 receives a multiplex made up of four superposed carriers at wavelengths $\lambda 1, \lambda 2, \lambda 3, \lambda 4$ without any interference occurring between the signals from the 16 outputs of the input functional modules IM1, IM2, IM3, IM4 and without any need for a complex protocol for sharing the buses B1, B2, B3, B4.

Figure 2:
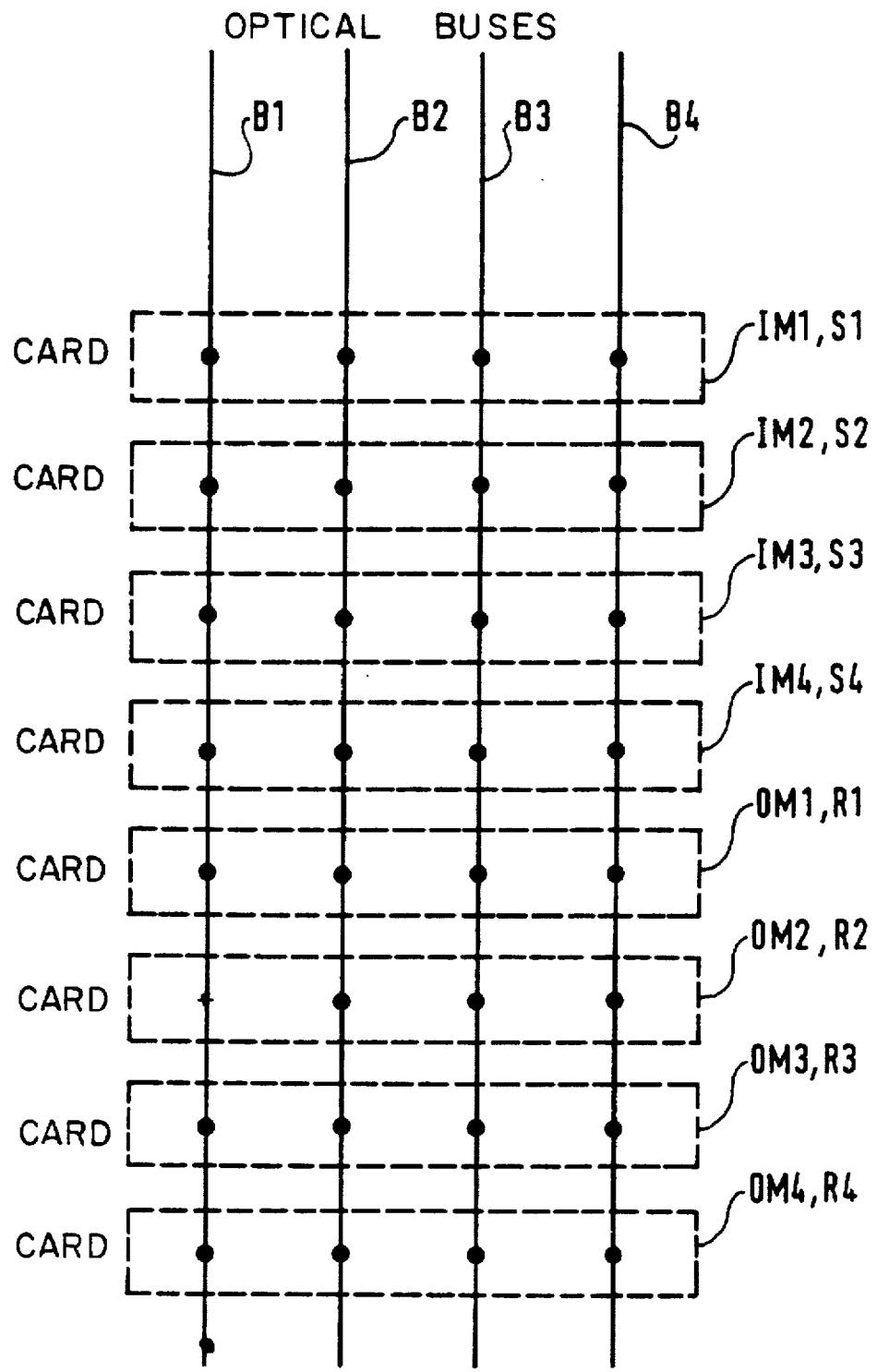
FIG. 2 is a diagrammatic representation of eight electronic circuit cards and four optical buses constituting this embodiment.

FIG. 2 is a diagrammatic representation of the layout of the cards on a backplane in this embodiment. The various subsystems can be distributed in the following manner:

one card carries the input functional module IM1 and the send subsystem S1;

one card carries the input functional module IM2 and the send subsystem S2;

one card carries the input functional module IM3 and the send subsystem S3;

one card carries the input functional module IM4 and the send subsystem S4;

one card carries the output functional module OM1 and the receive subsystem R1;

one card carries the output functional module OM2 and the receive subsystem R2;

one card carries the output functional module OM3 and the receive subsystem R3; and one card carries the output functional module OM4 and the receive subsystem R4.

The backplane also carries the four optical buses B1, B2, B3, B4 each of which has five couplers integrated into it.

These couplers are represented by the black dots in the figure. Each coupler has an optical connector for connecting it to an optical connector on a card.

The first four cards have four optical connectors and the last four cards each have only one optical connector. This figure shows the extreme simplicity of the resulting interconnections. In the case of a matrix with N×N ports, the number of optical buses on the backplane is equal to N, i.e. it does not increase unacceptably as the number N of ports is increased. The number of optical transmitters associated with each input functional module is also equal to N, so that there is no insurmountable problem in mounting them on one card. Likewise, the number of optical receivers OR associated with each output functional module is equal to N, so that there is no problem in mounting them on one card. The principal limitation in the current state of the art concerns the number of wavelengths that can be separated by means of a single spectral demultiplexer DM. At present 16 wavelengths can be separated without difficulty. It is therefor possible to use this structure to implement matrices with 16×16 ports operating at 2.5 Gbit/s.

There is claimed:

1. Switching matrix including:

N input functional modules each having one input and N outputs;

N output functional modules each having N inputs and one output;

a broadcast network having $N^2$ inputs connected to the $N^2$ outputs of the input functional modules and $N^2$ outputs connected to the $N^2$ inputs of the output functional modules to broadcast simultaneously N signals from each input functional module to each output functional module;

wherein said broadcast network includes:

N send subsystems each including means for sending N optical carriers at different wavelengths $\lambda_i$ where i=1, . . . , N, respectively modulated by N signals from an input functional module;

N receive subsystems each including means for receiving N optical carriers at said wavelengths, extracting N signals modulating the respective carriers and forwarding them to an output functional module; and N optical buses each coupled to a respective input of a receive subsystem and each coupled to a respective send subsystem so that the jth bus, for j=1 through N, receives from the kth send subsystem the carriers at the wavelengths:

$\lambda_{1-k(modulo\ N)}, \ldots, \lambda_{N-k(modulo\ N)}$.

2. Matrix according to claim 1 wherein said input functional modules and said output functional modules are electronic, said send subsystems each include N optical transmitters respectively adapted to be controlled by N electrical signals from N respective outputs of an input functional module, and said receive subsystems each include a spectral demultiplexer having N outputs providing N respective demultiplexed carriers at wavelength $\lambda_1, \ldots, \lambda_N$ and N optical receivers coupled to respective outputs of said demultiplexer and each providing an electrical signal representing a signal modulating the carrier supplied to that receiver.

* * * * *